March 9, 1965　　　F. JAKOB ETAL　　　3,172,345
CAMERA HAVING A BUILT-IN FLASH-BULB ARRANGEMENT
Filed Dec. 14, 1961　　　　　　　　　　3 Sheets-Sheet 1

INVENTOR.
FRANZ JAKOB
JOACHIM SPATZ
BY Toulmin & Toulmin
Attorneys

March 9, 1965  F. JAKOB ETAL  3,172,345
CAMERA HAVING A BUILT-IN FLASH-BULB ARRANGEMENT
Filed Dec. 14, 1961  3 Sheets-Sheet 2

INVENTOR.
FRANZ JAKOB
JOACHIM SPATZ
BY
Toulmin & Toulmin
Attorneys

March 9, 1965  F. JAKOB ETAL  3,172,345
CAMERA HAVING A BUILT-IN FLASH-BULB ARRANGEMENT
Filed Dec. 14, 1961  3 Sheets-Sheet 3

INVENTOR.
FRANZ JAKOB
JOACHIM SPATZ
BY
Toulmin & Toulmin
Attorneys

United States Patent Office 3,172,345
Patented Mar. 9, 1965

3,172,345
CAMERA HAVING A BUILT-IN FLASH-BULB ARRANGEMENT
Franz Jakob, Unterhaching, near Munich, and Joachim Spatz, Munich, Germany, assignors to Agfa Aktiengesellschaft, Leverkusen-Bayerwerk, Germany
Filed Dec. 14, 1961, Ser. No. 159,237
Claims priority, application Germany, Dec. 30, 1960, A 36,400
6 Claims. (Cl. 95—11)

The present invention relates to a camera having a flash-bulb arrangement, more particularly, to a camera having a flash-bulb reflector built into the casing in such a manner that the entire reflector is enclosed by the casing and the flash-bulb is within the outlines of the reflector.

In the conventional camera construction having a flash-bulb attachment the lamp socket is usually mounted on the top surface of the camera. Provision is made for mounting the reflector on the lamp socket. Therefore, in this construction the camera flash-bulb arrangement is complete only if the separate reflector is attached to the camera.

Cameras have subsequently been constructed wherein the flash-bulb reflector is mounted in the camera casing. In this construction, however, the flash-bulb structure and the view finder are as large as the entire camera case. As a result, such a camera cannot satisfactorily be used for taking action pictures. In addition, such cameras are usually simply constructed for use by relatively unskilled amateurs and the flash-bulb attachment is so mounted that it extends outwardly beyond the camera casing. In this position the flash-bulb attachment is readily susceptible to damage and is a source of danger to any personnel in the vicinity of the camera should there be any explosion of the flash-bulb.

It is therefore the principal object of the present invention to provide a novel and improved camera having a built-in flash-bulb attachment.

It is a further object of this invention to provide a camera wherein the flash-bulb reflector is built entirely within the outline of the camera case and has a height approximately equal to that of the view finder.

The disadvantages of the prior art as pointed out above are eliminated and the objects of the present invention are achieved by the photographic camera as disclosed herein. In the camera of this invention a flash-bulb reflector and the window of the view finder are both mounted in the front face of the camera along the top edge thereof. The entire reflector is enclosed within the outlines of the camera casing and further the reflector completely encloses a flash-bulb when it is mounted therein for use. The flash-bulb is thus readily accessible from outside of the camera but persons standing alongside the camera are protected from fragments of the flash-bulb should the bulb explode during operation. The present construction involves no changes in the outer dimensions of the camera casing and all of the elements necessary for flash-bulb exposures are fixedly mounted on the casing. Accordingly, this camera is instantly available for taking flash-bulb pictures merely upon the insertion of a flash-bulb in the lamp socket.

The opening of the flash-bulb reflector may be covered with a glass cover or a cover of another transparent material to provide added protection against exploding flash-bulbs.

An additional reflector may be mounted as an extension of the built-in reflector to obtain a greater concentration of the illumination provided by the flash-bulb.

The reflector may be either circular or rectangular in shape. With a rectangular reflector the flash-bulb is mounted so that the axis of the flash-bulb is substantially coaxial with the longitudinal axis of the reflector. The rectangular reflector provides a better concentration of the illumination of the flash-bulb for a built-in flash attachment.

Other objects and advantages of this invention will be apparent upon reference to the accompanying description when taken in conjunction with the following drawings, wherein FIGURE 1 is a top plan view of the camera embodying this invention with a portion of the camera casing removed to show a sectional view through the flash-bulb attachment;

Figure 1:
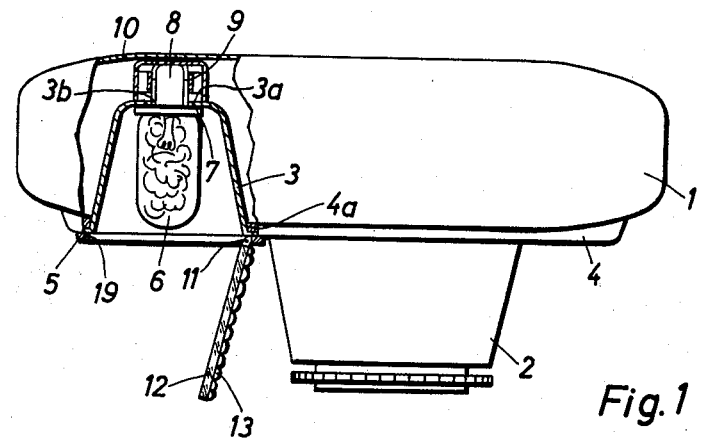

Returning now to the drawings wherein like reference symbols indicate the same parts throughout the various views, several embodiments of the present invention will be described in detail. With particular reference to FIGURE 1 there is illustrated a photographic camera having a casing 1 from which extends an objective mount 2. Mounted within the casing 1 at the left-hand end thereof as viewed in FIGURE 1 there is a flash-bulb reflector 3 which is mounted in an aperture 4a of a plate 4 mounted on the front face of the camera casing. A frame 5 retains the reflector in position. The bottom of the flash-bulb is indicated at 3a and has an opening 3b therein.

A flash-bulb 6 having a flange 7 between the bulb portion and the socket portion indicated at 8 is inserted through the opening 3b into the lamp socket 9 which is closely adjacent to the back wall or face 10 of the camera casing.

The reflector 3 is symmetrical and has substantially a circular transverse cross-section. The reflector may also have the shape of a frustum.

Figure 4:
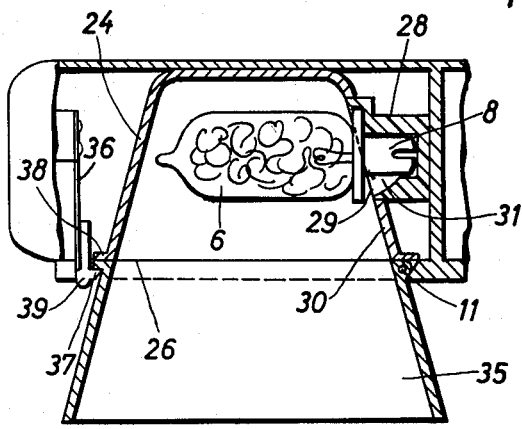
FIGURE 4 is a sectional view taken along the lines IV—IV of FIGURE 3.

On one edge of the frame 5 there is mounted a hinge 11 upon which is pivotally mounted a transparent protective plate 12. The cover plate 12 may be made of glass or a plastic material and the outer surface 13 is provided with a plurality of connected curved surfaces which may be in the form of portions of spherical surfaces. In FIGURE 1 the cover plate 12 is shown in the open position but may be retained in the closed position by a suitable latching mechanism such as a spring latch as illustrated in FIGURE 4.

For most general purposes the cover plate is tinted blue to serve as a filter for the illumination emanating from the flash-bulb. In addition, the shape and material of this cover plate can be so chosen so as to further concentrate the light from the flash-bulb. The cover plate may also be used to adapt the angle of illumination of the flash-bulb according to the shooting angle of the objective. The cover plate completely covers the front opening of the reflector so as to eliminate any danger from fragments of the flash-bulb after an explosion thereof.

Figure 2:
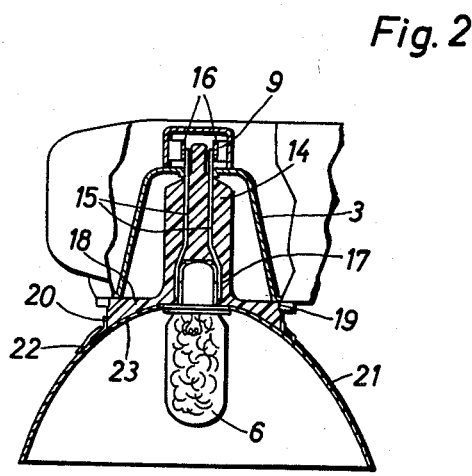
FIGURE 2 is a view similar to that of FIGURE 1 but showing only that portion of the camera which is in section and illustrating the structure of an intermediate socket adapter together with an outer reflector.

Proceeding next to FIGURE 2 there is shown an intermediate socket adapter 14 which is inserted in the lamp socket 9. The adapter 14 comprises a plastic base having two contact strips 15 therein which engage the contacts 16 of the lamp socket 9. These contact strips also extend to an outer socket 17 which is approximately positioned in the plane of the front face of the camera. There is a disc 18 which is integral with the outer end of the adapter 14. The disc 18 is shaped to closely cover the opening 19 in the front portion of the reflector 3. The outer edge of the disc 18 is provided with bayonet flaps 20. An outer reflector 21 is fastened to the disc 18 by means of bayonet flaps 22 which cooperate with the flaps 20. The front surface of the disc 18 is provided with concave shape 23 so as to closely receive the end of the outer reflector 21.

As an alternative construction the outer reflector 21 can be permanently attached to the intermediate socket adapter 14. Any suitable connecting means can be used to fasten the outer reflector to the intermediate socket. The disc 18 can be fixedly mounted onto the outer reflector 21 and then attached to the adapter 14. The outer reflector 21 may have different shapes depending upon the photographic conditions encountered.

Figure 3:
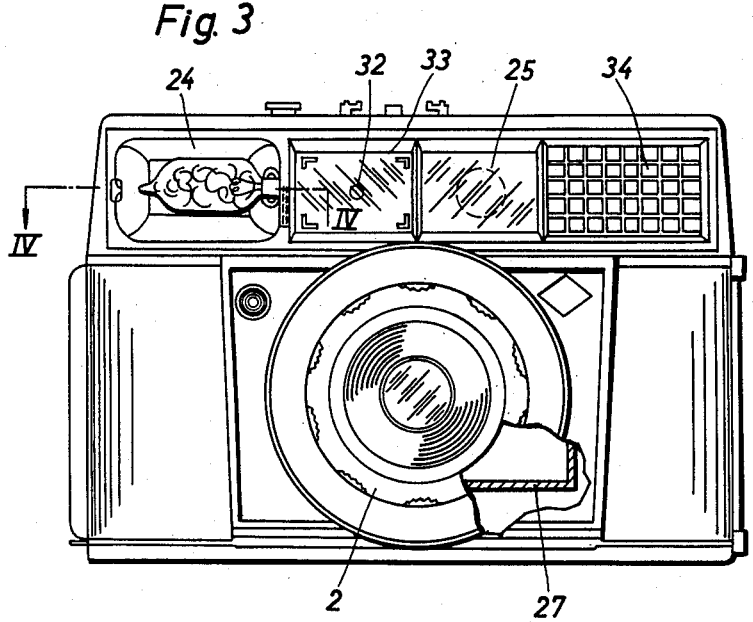
FIGURE 3 is a front elevational view of a camera embodying the present invention.

Proceeding next to FIGURES 3 and 4 there is shown a photographic camera having a flash-bulb reflector 24 which is substantially rectangularly shaped or tub-shaped. The casing of the camera as viewed in FIGURE 3 is substantially rectangular and the reflector 24 is positioned at one end of the camera adjacent a longer edge of the front face of the camera. The reflector is positioned so that its longitudinal axis is parallel to the longer edge of the camera casing and the reflector axis is horizontal when the camera is in the normal operating position, as shown in FIGURE 3. The front edge or opening of the reflector is indicated at 26 and this opening has dimensions which are proportional to the image aperture 27 of the camera. In addition, the opening 26 of the reflector is in the same relative position as the image aperture 26, that is, the longer axes of the reflector opening 26 and the image aperature 27 are parallel to the longer edges of the camera casing.

A lamp socket 28 is positioned on the shorter edge of the reflector 24 which edge is closer to the optical axis or objective of the camera. A slot 29 is provided in the reflector wall 30 in which the lamp socket 28 is mounted to facilitate insertion of the flash-bulb 6 into the lamp socket. With this structure the inner walls of the reflector 24 can closely enclose the flash-bulb 6.

A protective cover plate 8 of a transparent material can also be mounted in front of the reflector 24 in a manner as previously described.

Positioned laterally of the reflector 24 and along the same longer edge of the casing is a view finder 25, a range finder 31 which may have image boundary lines 33 therein, and a window 34 behind which is mounted a photoelectric cell which comprises an element of an exposure meter in a manner which is known to the art. Thus, these four elements can be arranged in a line and enclosed by a common frame or can be arranged symmetrically with respect to the center of the camera and also surrounded by a common frame.

An outer reflector 35 can be mounted on the outer edge of the reflector 24 so as to form an extension thereof. An intermediate socket adapter can also be used with this arrangement except that the socket adapter would have an angular shape. The outer reflector 35 can be retained in position by a spring latch 36 having a nose or locking portion 37 which engages a flange 38 of the outer reflector. The latch 36 is provided with a knob or handle 39 by which the latch may be released from the outer reflector.

This construction provides an exceptionally sharp concentration of illumination from the flash-bulb. The sizes and shapes of outer reflectors which are used will depend on the conditions encountered. The transparent protective cover may also be mounted on the outer edge of the reflector 35. As an alternative, the outer reflector 35 can be constructed so as to fit onto the reflector 24 without removing the cover plate 12 but by merely pivoting the cover plate to one side or by mounting the outer reflector on top of the cover plate.

The arrangement illustrated in FIGURES 3 and 4 is particularly suitable when the length of the flash-bulb is somewhat greater than the depth or thickness of the camera casing.

As illustrated in FIGURES 3 and 4, the flash-bulb is positioned so that its longitudinal axis is vertical to the optical axis of the camera and parallel to the direction of movement of the film in the camera casing. For certain applications it may be advantageous to have the flash-bulb mounted so that its longitudinal axis is perpendicular to the path of movement of film through the camera casing. This can be accomplished by providing a suitable notch in the top wall of the reflector 24 and a corresponding notch in the top edge of the camera casing. The flash-bulb is then inserted into its socket through this notch in the top of the camera casing and is ejected through the top of the camera by the ejector after ignition.

Figure 5:
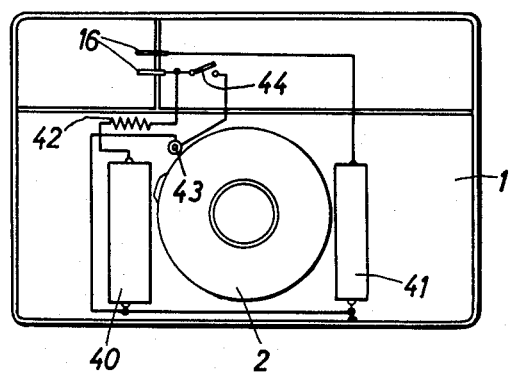
FIGURE 5 is a schematic diagram showing the electrical wiring of the flash-light attachment of this camera energized by a battery and capacitor.

In the wiring diagram of FIGURE 5 a battery 40 and a capacitor 41 are mounted in the camera casing 1 and are positioned on both sides of the objective mount 2. In this position both the battery and the capacitor are accessible from the bottom of the camera casing. A suitable electrical resistance 42 is connected in series with the battery. A contact 43 is actuated by the camera shutter and an adjusting contact for flash-bulb exposures is provided at 44. The contacts 16 of the lens socket are connected to the capacitor 41. By closing the contacts 43 and 44 the condenser 41 is discharged in the usual manner by the ignition of the flash-bulb.

Figure 6:
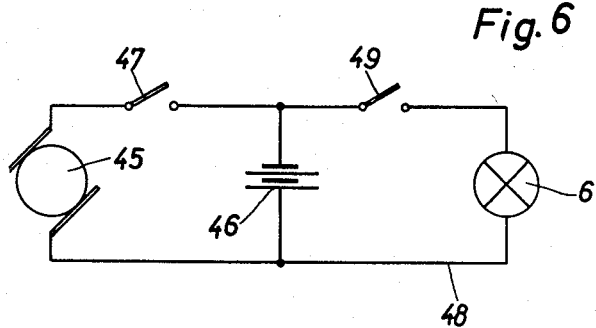
FIGURE 6 is a schematic diagram showing the wiring circuit for a flash-bulb attachment of a camera driven by an electric motor.

In FIGURE 6 a modified electrical circuit is shown wherein an electric motor 45 is provided for the forward movement of film through the camera with the motor being driven by a battery 46 and controlled by means of a contact or switch 47. The flash-bulb 6 is connected in parallel with the motor 45 in a circuit indicated at 48. A contact 49 is provided for energizing the flash-bulb. The electrical energy for igniting the flash-bulb 6 is obtained directly from the battery 46 which is also used for driving the camera.

Thus it can be seen that the present invention has provided a simplified and compact construction of a built-in flash-bulb reflector in a photographic camera. The reflector is completely enclosed within the outlines of the camera casing but may be extended by an outer reflector so as to increase the versatility of this flash-bulb attachment.

It will be understood that this invention is susceptible to modification in order to adapt it to different usages and conditions and, accordingly, it is desired to comprehend such modifications within this invention as may fall within the scope of the appended claims.

What is claimed as this invention is:

1. A camera comprising a substantially rectangular casing having front and back faces, a view finder having a window in the front face of said casing along a longer edge thereof, a flash-bulb reflector positioned within said casing and having a depth sufficient to completely enclose a flash-bulb normally used therein, said reflector being positioned laterally of said view finder window along said longer edge and having a size approximately equal to said view finder window, and an outer reflector mounted on said camera casing in front of said first-mentioned reflector.

2. A camera comprising a substantially rectangular casing having front and back faces, a view finder having a window in the front face of said casing along a longer edge thereof, a flash-bulb reflector positioned within said casing and having a depth sufficient to completely enclose a flash-bulb normally used therein, said reflector having a lamp mount therein along the central axis thereof, an intermediate socket detachably inserted in said lamp mount, said reflector being symmetrical about its central axis, said reflector being positioned laterally of said view finder window along said longer edge and having a size approximately equal to said view finder window, and an outer reflector removably attached on said intermediate socket.

3. A camera as claimed in claim 2 and having a bayonet connection between said outer reflector and said intermediate socket.

4. A camera comprising a substantially rectangular casing having front and back faces, a view finder having a window in the front face of said casing along a longer edge thereof, a flash-bulb reflector positioned within said casing and having a depth sufficient to completely enclose a flash-bulb normally used therein, said reflector being positioned laterally of said view finder window along said longer edge and having a size approximately equal to said view finder window, said reflector having a substantially rectangular shape, a lamp mount in said reflector at the shorter end thereof with the axis of said lamp mount being parallel with the longitudinal axis of said reflector, and an outer reflector mounted on the outer edge of said rectangular reflector with said outer reflector being circular and forming an extension of said rectangular reflector.

5. A camera comprising a substantially rectangular casing having front and back faces, a view finder having a window in the front face of said casing along a longer edge thereof, a flash-bulb reflector positioned within said casing, said reflector being positioned laterally of said view finder window along said longer edge and having a height approximately equal to the height of said view finder window, said reflector having a substantially elongated rectangular shape, and a lamp mount in said reflector at the shorter end thereof with the axis of said lamp mount being parallel with the longitudinal axis of said reflector, the lamp mount being positioned at that shorter end of the reflector which is closer to the optical axis of the camera.

6. The invention as defined in claim 5 wherein a range finder is positioned between said view finder and said reflector.

References Cited by the Examiner
UNITED STATES PATENTS

| | | | |
|---|---|---|---|
| 2,783,696 | 3/57 | Sewig | 95—11.5 X |
| 2,972,673 | 2/61 | Graef | 95—11.5 X |
| 2,977,865 | 4/61 | Irwin | 95—11 |
| 3,051,066 | 8/62 | Lareau | 95—11.5 |

NORTON ANSHER, *Primary Examiner.*

JOHN M. HORAN, *Examiner.*